(12) United States Patent
Liikanen

(10) Patent No.: US 11,748,008 B2
(45) Date of Patent: Sep. 5, 2023

(54) CHANGING OF MEMORY COMPONENTS TO BE USED FOR A STRIPE BASED ON AN ENDURANCE CONDITION

(71) Applicant: Micron Technology, Inc., Boise, ID (US)

(72) Inventor: Bruce A. Liikanen, Berthoud, CO (US)

(73) Assignee: Micron Technology, Inc., Boise, ID (US)

( * ) Notice: Subject to any disclaimer, the term of this patent is extended or adjusted under 35 U.S.C. 154(b) by 18 days.

(21) Appl. No.: 17/403,647

(22) Filed: Aug. 16, 2021

(65) Prior Publication Data
US 2021/0373787 A1 Dec. 2, 2021

Related U.S. Application Data

(63) Continuation of application No. 16/460,787, filed on Jul. 2, 2019, now Pat. No. 11,106,370.

(51) Int. Cl.
*G06F 3/06* (2006.01)
*G06F 11/10* (2006.01)

(52) U.S. Cl.
CPC .......... *G06F 3/0635* (2013.01); *G06F 3/0616* (2013.01); *G06F 3/0653* (2013.01); *G06F 3/0659* (2013.01); *G06F 3/0689* (2013.01); *G06F 11/1076* (2013.01)

(58) Field of Classification Search
CPC .... G06F 3/0616; G06F 3/0653; G06F 3/0689; G06F 3/06; G06F 3/0688; G06F 3/0683; G06F 2212/262; G06F 2212/7211; G06F 2212/72; G06F 2212/7208
See application file for complete search history.

(56) References Cited

U.S. PATENT DOCUMENTS

| | | | |
|---|---|---|---|
| 8,176,284 B2 | 5/2012 | Frost et al. | |
| 8,775,868 B2 | 7/2014 | Clogrove et al. | |
| 2010/0017649 A1 | 1/2010 | Wu et al. | |
| 2013/0262920 A1 | 10/2013 | Jung et al. | |
| 2014/0040681 A1 | 2/2014 | Wolfman et al. | |

(Continued)

OTHER PUBLICATIONS

Wang, W., Xie, T., and Sharma, "SWANS: An Interdisk Wear-Leveling Strategy for RAID-0 Structured SSD Arrays," ACM Transaction on Storage vol. 12 No. 3, Article 10, Apr. 2016.

(Continued)

*Primary Examiner* — Tracy A Warren
(74) *Attorney, Agent, or Firm* — LOWENSTEIN SANDLER LLP

(57) ABSTRACT

A system includes dice and a processing device operatively coupled to the dice. The processing device to perform operations including: storing data of one or more stripes at a first group of dice; determining that the first group of dice has satisfied an endurance condition threshold comprising a predetermined number of write operations or bit errors; changing the endurance condition threshold to a changed endurance condition threshold, wherein the changed endurance condition threshold is based on a number of the first group of dice to come within a threshold percentage of satisfying the endurance condition threshold; and using the changed endurance condition threshold to determine a time to store data of one or more subsequent stripes at a second group of dice, wherein the second group of dice includes at least one die that is not included in the first group of dice.

20 Claims, 7 Drawing Sheets

(56) References Cited

U.S. PATENT DOCUMENTS

| | | |
|---|---|---|
| 2014/0181595 A1 | 6/2014 | Hoang et al. |
| 2014/0281121 A1 | 9/2014 | Karamcheti et al. |
| 2016/0004458 A1 | 1/2016 | Micheloni et al. |
| 2017/0003880 A1 | 1/2017 | Fisher et al. |
| 2017/0115897 A1 | 4/2017 | Franke et al. |
| 2018/0246794 A1 | 8/2018 | Baty et al. |
| 2018/0284997 A1 | 10/2018 | Dalmatov |
| 2020/0327953 A1 | 10/2020 | Fleming et al. |

OTHER PUBLICATIONS

International Serach Report and Written Opinion for International Application No. PCT/US2020/040361, dated Oct. 5, 2020, 11 pages.

CHANGING OF MEMORY COMPONENTS TO BE USED FOR A STRIPE BASED ON AN ENDURANCE CONDITION

RELATED APPLICATION

This application is a continuation of U.S. patent application Ser. No. 16/460,787, filed Jul. 2, 2019, which is herein incorporated by reference in its entirety.

TECHNICAL FIELD

The present disclosure generally relates to a memory sub-system, and more specifically, relates to the changing of memory components to be used for a stripe based on an endurance condition at a memory sub-system.

BACKGROUND

A memory sub-system can be a storage system, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
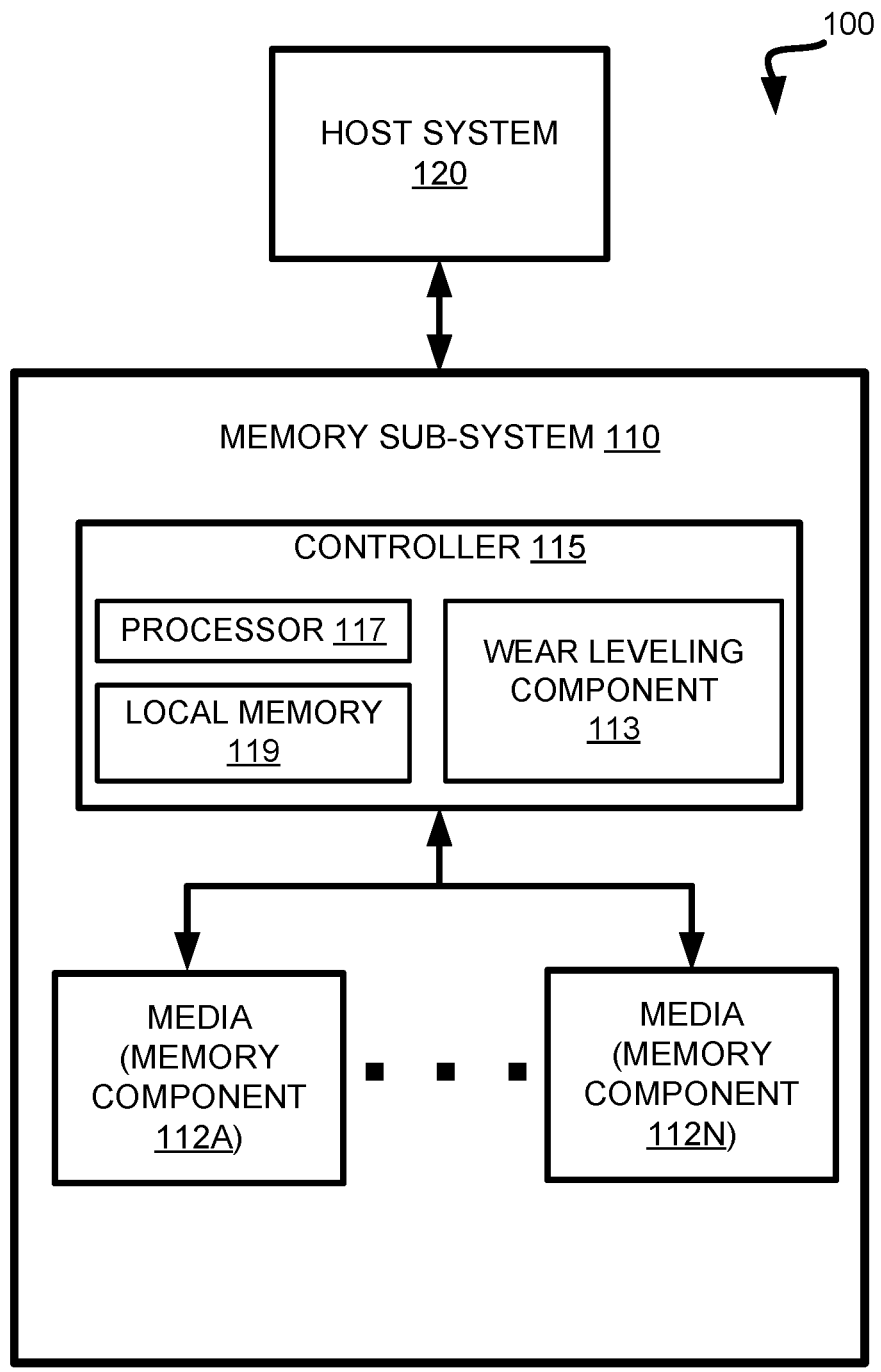
FIG. 1 illustrates an example computing environment that includes a memory sub-system in accordance with some embodiments of the present disclosure.

Aspects of the present disclosure are directed to the changing of memory components to be used for a stripe based on an endurance condition at a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components. The host system can provide data to be stored at the memory sub-system and can request data to be retrieved from the memory sub-system.

A conventional memory sub-system can utilize a redundancy operation when storing data at the memory components of the memory sub-system. For example, a redundant array of independent NAND (RAIN) operation can be implemented to provide redundancy for the data stored at the memory sub-system. The redundancy operation can protect the data against a failure at the memory sub-system by storing data in a stripe (hereinafter also referred to as "RAIN stripe") across multiple memory components (i.e., dice). A RAIN stripe can refer to a group of data blocks or user data elements that are associated with a single parity data. For example, as user data is received from the host system, the user data can be stored as data blocks across multiple memory components. A parity data can also be generated for the user data that is stored across the memory components. The parity data may be generated based on an exclusive-or (XOR) operation with the received user data and can be used to reconstruct or recalculate the user data of the RAIN stripe in the event of a failure at the memory sub-system. For example, if any user data stored at a particular memory component fails, the parity data can be combined with the remaining user data to reconstruct the user data at the failed memory component. Thus, user data and a corresponding parity data can be stored across multiple memory components or dice of the memory sub-system.

In a conventional memory sub-system, the data for a RAIN stripe is stored across each of the memory components (i.e., dice) of the memory sub-system. The storing of data at a memory component can increase the wear of the memory component. After a threshold amount, or predetermined number, of write operations are performed at a memory component, the wear of the memory component can cause the memory component to become unreliable so that data can no longer be reliably stored and retrieved from the memory component. At such a point, the memory sub-system can result in a failure when any of the memory component fails.

Aspects of the present disclosure address the above and other deficiencies by changing memory components for a RAIN stripe based on a change in an endurance condition. For example, a memory sub-system can include an additional memory component or die that is not currently being used to store data of a RAIN stripe. Thus, a group of the memory components of the memory sub-system can be used to store data of RAIN stripes. In response to an endurance condition being satisfied, such as the bit error rate or a number of write operations of one of the memory components meeting or exceeding a threshold, the group of memory components to be used to store data of subsequent RAIN stripes can be changed. For example, the memory component with the highest endurance condition (e.g., highest bit error rate or most write operations) can be switched with the additional memory component that is not currently being used. Subsequent endurance conditions can be used to continue switching a memory component with another memory component that is not currently being used. As a result, the wear of the memory components can be more evenly distributed throughout the operating lifetime of the memory sub-system.

Advantages of the present disclosure include, but are not limited to, an improvement to the operating lifetime of the memory sub-system. For example, since the wear of the memory components can be distributed more evenly across multiple memory components as opposed to being more weighted towards a subset of the memory components, a memory component or die can be expected to fail after a longer period of time. As a result, the memory sub-system can be used with an increased operating lifetime as the first failure of a memory component or die can be expected to occur later during the operating lifetime of the memory sub-system.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a wear leveling component 113 that can be used to perform a wear leveling operation for the memory sub-system 110. In some embodiments, the controller 115 includes at least a portion of the wear leveling component 113. For example, the controller 115 can include a processor 117 (processing device) configured to execute instructions stored in local memory 119 for performing the operations described herein. In some embodiments, the wear leveling component 113 is part of the host system 120, an application, or an operating system.

The wear leveling component 113 can determine a group of memory components or dice that are to be used to store data of a RAIN stripe. The wear leveling component 113 can receive an indication that an endurance condition of the group of memory components has been satisfied. In response to the endurance condition being satisfied, the group of memory components can be changed. For example, a memory component can be switched with another memory component that was not included in the group. Further details with regards to the operations of the wear leveling component 113 are described below.

Figure 2:
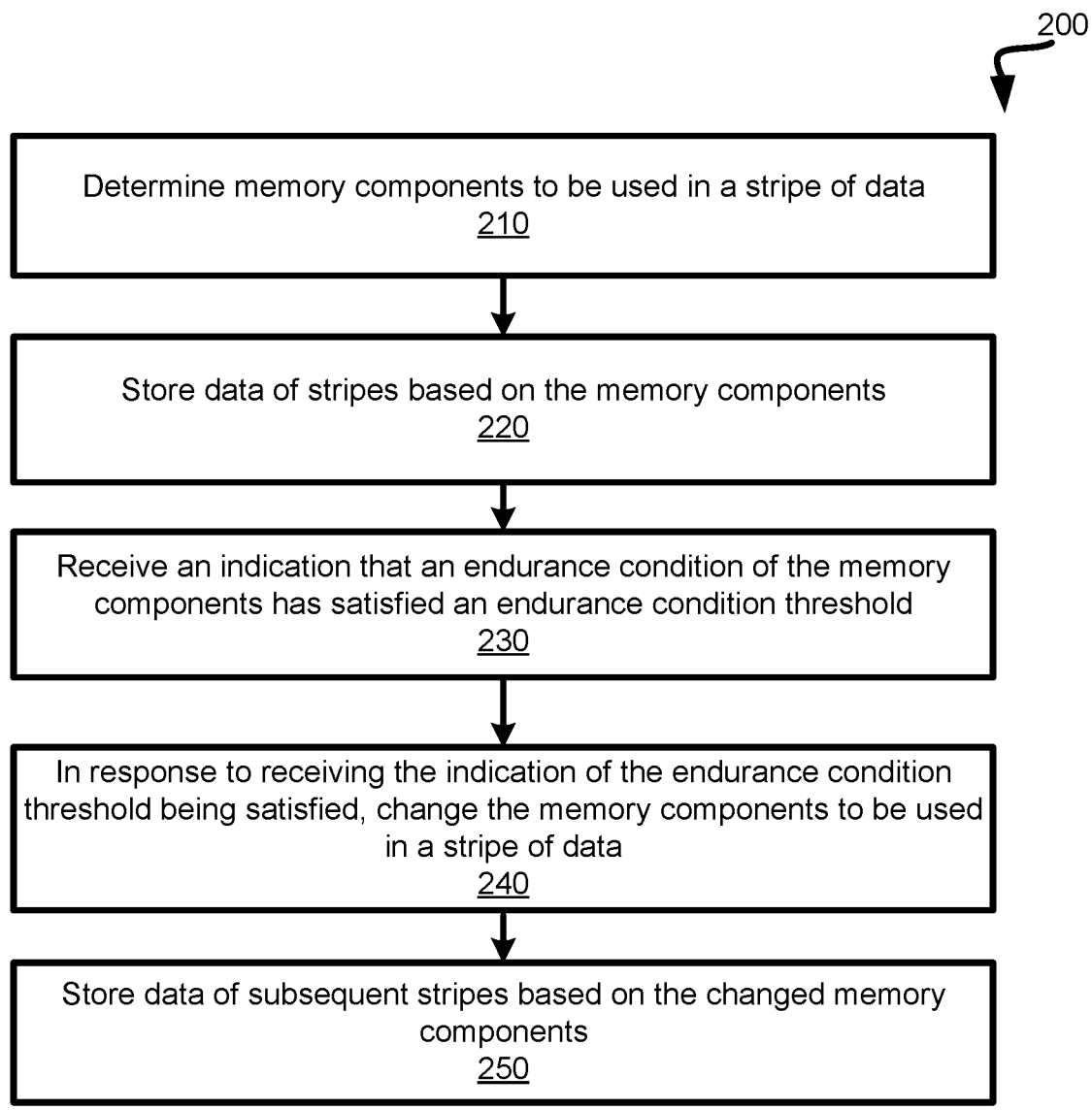
FIG. 2 is a flow diagram of an example method to change memory components to be used for a stripe based on an endurance condition in accordance with some embodiments.

FIG. 2 is a flow diagram of an example method 200 to change memory components to be used for a stripe based on an endurance condition in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the wear leveling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic determines memory components to be used in a stripe of data. For example, a first group or first subset of memory components (i.e., dice) that are included in a memory sub-system can be identified. In some embodiments, the first group of memory components can be the memory components that are associated with lower wear or a better endurance condition. For example, the memory components of the first group can be the memory components included in the memory sub-system that have the fewest number of write operations performed at each of the respective memory components and/or the memory components with the lowest bit error rates. A bit error rate can refer to a number of bit errors that are identified when data is retrieved from the respective memory component (e.g., the number of errors that occur when reading stored data). In some embodiments, at the beginning of the operating lifetime of the memory sub-system, a data structure at a controller of the memory sub-system can be retrieved to identify the memory components with the better endurance condition as specified by a manufacturer of the memory sub-system. Thus, the first group of memory components can be a subset of the memory components that have had fewer write operations performed or have a better endurance condition than a second subset of memory components of the memory sub-system. The second subset of memory components can be one or more dice of the memory sub-system that are over-provisioned or that are not currently used to store data of stripes at the initial operating lifetime of the memory sub-system.

At operation 220, the processing logic stores data of stripes based on the memory components. For example, as previously described, a stripe can be a combination of user data and a corresponding parity data. In some embodiments, the stripe can be user data blocks and a parity data block where each user data block and the parity data block are stored at different memory components of the first group of memory components. For example, for a case of three user data blocks in a stripe, a parity data block can be generated based on an exclusive-or (XOR) operation between the three user data blocks. Each of the first three user data blocks can be stored at separate memory components of the first group and the generated parity data block can be stored at the remaining memory component of the first group. Thus, the data blocks of the stripe can be stored or distributed across the memory components that are selected to be in the first group. At operation 230, the processing logic receives an indication that an endurance condition of the memory components has satisfied an endurance condition threshold. The endurance condition threshold can be based on a number of write operations and/or a bit error rate. For example, the endurance condition threshold can be satisfied when a number of write operations for any memory component included in the first group of memory components meets or exceeds a threshold number of write operations (i.e., a write operation count threshold). In some embodiments, the endurance condition threshold can be satisfied when a bit error rate for any memory component included in the first group of memory components meets or exceeds a threshold bit error rate.

As shown in FIG. 2, the processing logic changes the memory components to be used in a subsequent stripe of data in response to receiving the indication that the endurance condition threshold has been satisfied. For example, a second group of memory components can be identified from the memory components that are included in the memory sub-system. The second group of memory components can be identified by removing one or more memory components from the first group and replacing the removed one or more memory components with a corresponding number of memory components that were not included in the first group. For example, at least one memory component of the first group can be replaced with a memory component that was not being used to store data of the prior stripes that were stored across the first group of memory components. At operation 250, the processing logic stores the data of subsequent stripes based on the changed memory components. Thus, a memory component with the worst endurance condition can be removed and another memory component that was not being used can be added to store data of subsequent stripes from the host system.

Figure 3:
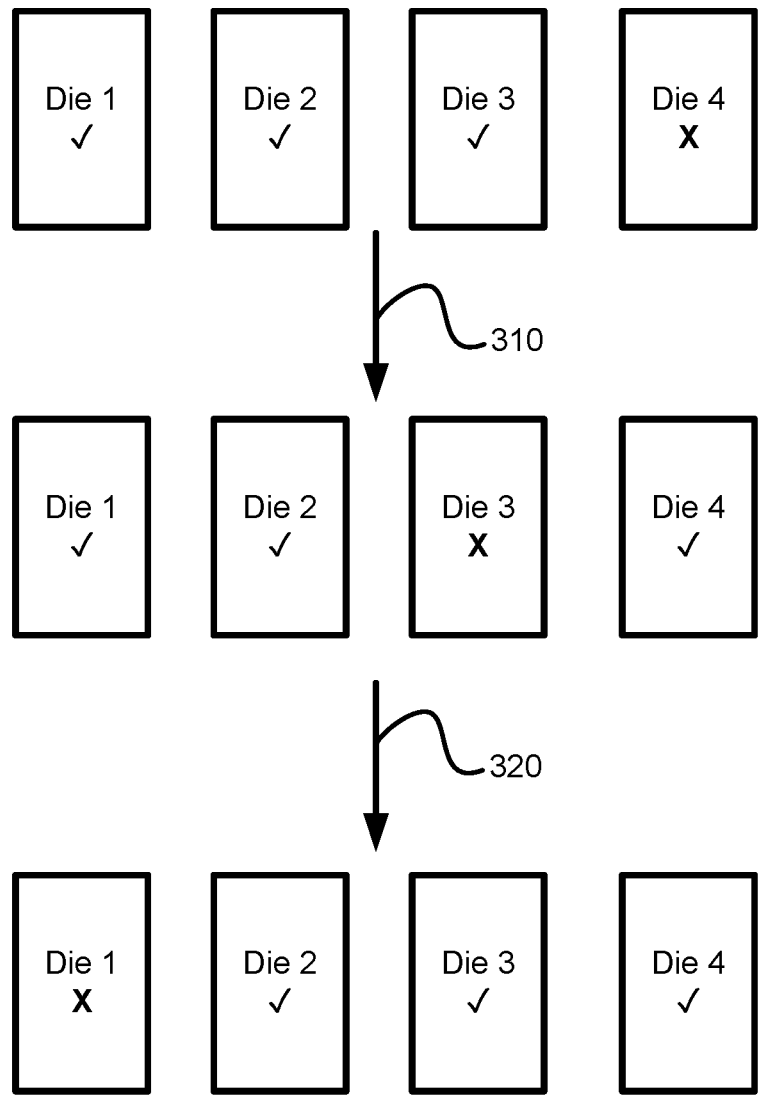
FIG. 3 illustrates the changing of dice used for a stripe in accordance with some embodiments of the present disclosure.

FIG. 3 illustrates the changing of dice used for a stripe in accordance with some embodiments of the present disclosure. The invalid data can be replaced by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the changing of the dice is performed by the wear leveling component 113 of FIG. 1.

As shown in FIG. 3, a group of dice (i.e., memory components) can be included in a memory sub-system. Four dice are illustrated, but any number of dice can be included in the memory sub-system. As previously described, at least one of the dice can be overprovisioned or not be currently used by the memory sub-system at any given time. For example, at the initial point in the operating lifetime of the memory sub-system, three of the dice can be used to store striped data from a host system. For example, dice 1, 2, and 3 can be used to store data for a stripe while die 4 can be overprovisioned and not used to store data for a stripe while dice 1, 2, and 3 are used to store data for a stripe. An event 310 can occur based on an endurance condition of the dice 1, 2, and/or 3. For example, one or more of the dice 1, 2, and 3 can have a bit error rate that exceeds a bit error rate threshold. In some embodiments, the bit error rate of a die can increase as write operations are performed on the die. In response to the event 310 occurring, the group of dice that are used to store the data of a stripe can be changed. For example, the die 3 can be removed from the group and the die 4 can be added to the group so that data of a subsequent stripe can be stored at dice 1, 2, and 4 while not being stored at die 3. The die 3 can represent the die with the highest bit error rate (e.g., the worst endurance condition) of the dice 1, 2, and 3.

Furthermore, another event 320 can occur where the event 320 can be another endurance condition threshold being satisfied. The endurance condition threshold can be increased from the prior endurance threshold condition of the event 310. For example, the event 320 can be the occurrence of one of the dice 1, 2, and 4 having a bit error rate that exceeds the bit error rate threshold that was increased from the prior bit error rate threshold. In response to the event 320, the group of dice can be changed again. For example, the die 1 can be identified as having the worst endurance condition of the dice 1, 2, and 4 and, as such, the die 1 can be removed and the die 3 can be added to the group of dice. Data of subsequent dice can then be stored at the new group of dice until another endurance condition threshold has been satisfied.

Figure 4:
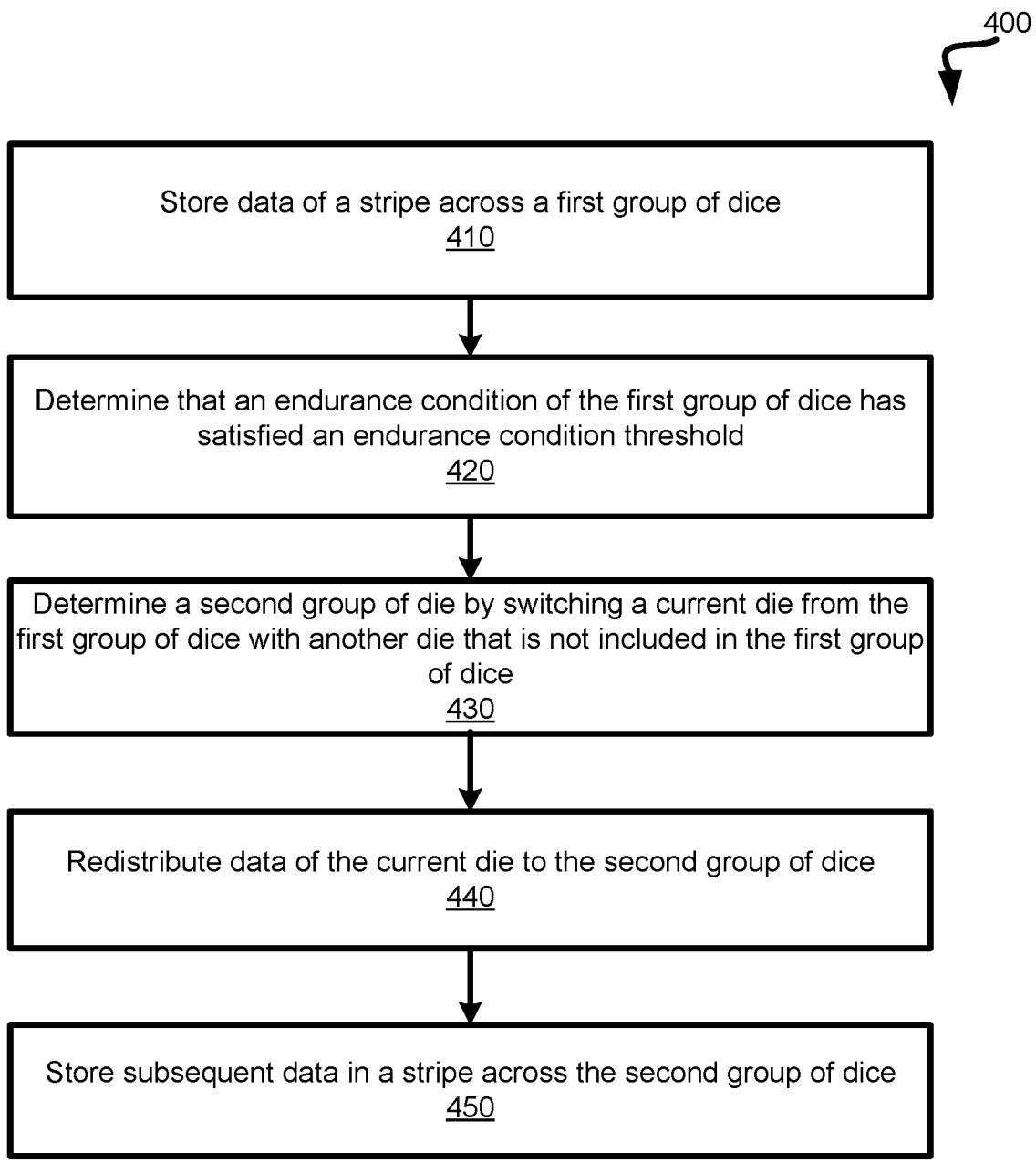
FIG. 4 is a flow diagram of an example method to change the dice to be used for a stripe in accordance with some embodiments of the present disclosure.

FIG. 4 is a flow diagram of an example method 400 to change the dice to be used for a stripe in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the wear leveling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4, at operation 410, the processing logic stores data of a stripe across a first group of dice. For example, the user data and a parity data of a stripe can be stored at a subset of dice that are included in a memory sub-system. At operation 420, the processing logic determines that an endurance condition of the first group of dice has satisfied an endurance condition threshold. The endurance condition threshold can be based on an endurance characteristic of the dice in the first group of dice. For example, the endurance condition threshold can be satisfied when a bit error rate or a total number of write operations of any die in the first group of dice has reached or exceeds a threshold bit error rate or a threshold total number of write operations.

At operation 430, the processing logic determines a second group of dice by switching a current die from the first group of dice with another die that is not included in the first group of dice. For example, a die from the first group of dice can be removed and a die that was not included in the first group can be added to constitute a second group of dice. Thus, a different group of dice can be used to store data of a subsequent stripe. In some embodiments, the memory sub-system can include multiple dice that are not included in the first group of dice. The number of dice that are switched with other dice that are not included in the first group of dice can be based on a number of dice of the first group of dice that have approached the endurance condition threshold. For example, if a single die of the first group of dice has reached the endurance condition threshold and a second die is within a threshold range of the endurance condition threshold, then both dice can be replaced with two dice that were not being used in the first group of dice. In the same or alternative embodiments, the number of dice from the first group that are replaced can be based on a rate of increase of the endurance condition over a period of time. For example, if a die reached the endurance condition threshold in less time, then more dice can be replaced from the first group of dice.

As shown in FIG. 4, at operation 440, the processing logic redistributes the data of the current die to the second group of dice. For example, the data stored at the die that is to be replaced can be distributed throughout the dice of the second group of dice. In some embodiments, the data can be copied and stored at the new die that is to be added to the second group of dice. In the same or alternative embodiments, the current die that is removed can be erased in response to removing the die from a group of dice. Furthermore, at operation 450, the processing logic stores subsequent data in a stripe across the second group of dice. For example, the group of dice that are used to store user data and a corresponding parity data can be different than the prior group of dice that were used to store a prior stripe.

Figure 5A:
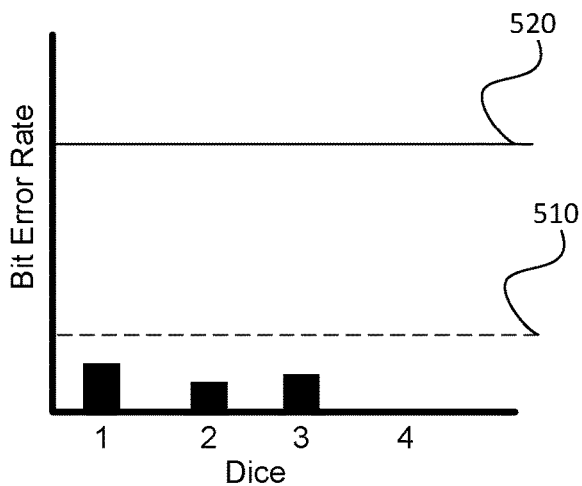
FIG. 5A illustrates a bit error rate condition associated with dice in accordance with some embodiments of the present disclosure.

FIG. 5A illustrates a bit error rate condition associated with dice in accordance with some embodiments of the present disclosure. As shown, the bit error rate if dice can increase over the operating lifetime of the memory sub-system. For example, at a first time, dice 1, 2, and 3 can be used to store data of a stripe while die 4 is not being used to store data of a stripe. As a result, the bit error rates of dice 1, 2, and 3 can increase towards the bit error rate threshold 510. The failure threshold 520 can indicate the point at which the memory sub-system is considered to fail. For example, the memory sub-system can be considered to fail when the bit error rate of any die reaches the bit error rate indicated by the failure threshold 520.

Figure 5B:
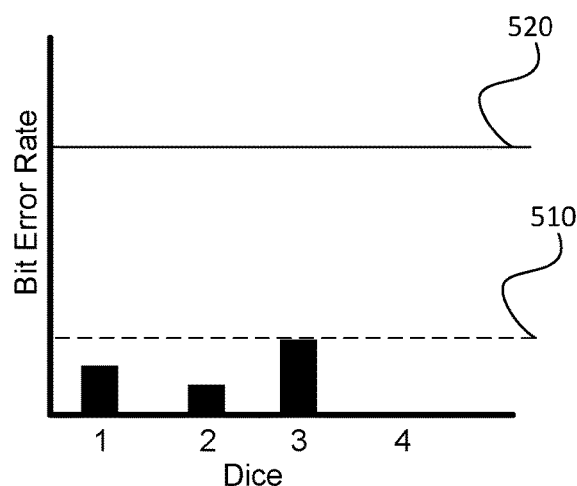
FIG. 5B illustrates the switching of dice based on a bit error rate condition in accordance with some embodiments of the present disclosure.

FIG. 5B illustrates the switching of die based on a bit error rate condition stripe in accordance with some embodiments of the present disclosure. As shown, the bit error rate of die 3 can reach the bit error rate threshold 510. As a result, an endurance condition threshold can be considered to be satisfied.

Figure 5C:
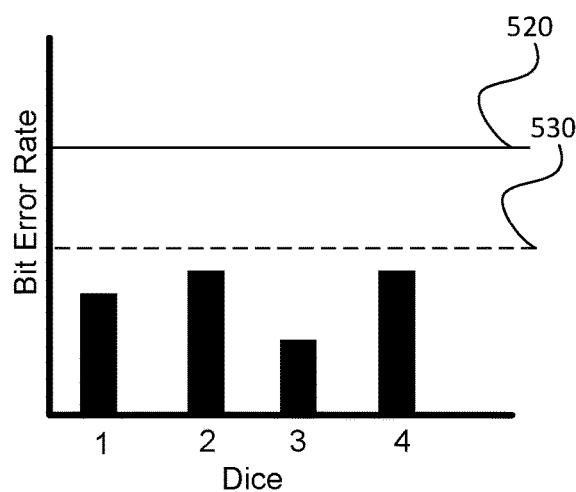
FIG. 5C further illustrates the switching of dice based on a bit error rate condition in accordance with some embodiments of the present disclosure.

FIG. 5C further illustrates the switching of dice based on a bit error rate condition stripe in accordance with some embodiments of the present disclosure. As shown, the die 3 can be removed from being used to store data of a stripe while die 4 is to be added to store data of a stripe. Thus, the group of dice that are used to store data of a stripe are dice 1, 2, and 4. The bit error rate of the dice 1, 2, and 4 can increase over the operating lifetime of the memory sub-system. A second bit error rate threshold 530 can be used to determine the next event for when the group of dice are to be changed. For example, the second bit error rate threshold 530 can be increased from the bit error rate threshold 510. As a result, when at least one die of the dice 1, 2, and 4 reaches or exceeds the second bit error rate threshold 530, the group of dice that are used to store data of a stripe can be changed again. The bit error rate thresholds can continue to be increased as a die reaches the respective threshold until the bit error rate threshold is at the failure threshold 520. Once any die is determined to have a bit error rate that satisfies the failure threshold 520, then the memory sub-system can be considered to fail. In some embodiments, the memory sub-system can be considered to fail when two or more dice have a bit error rate that satisfies the failure threshold 520.

Figure 6:
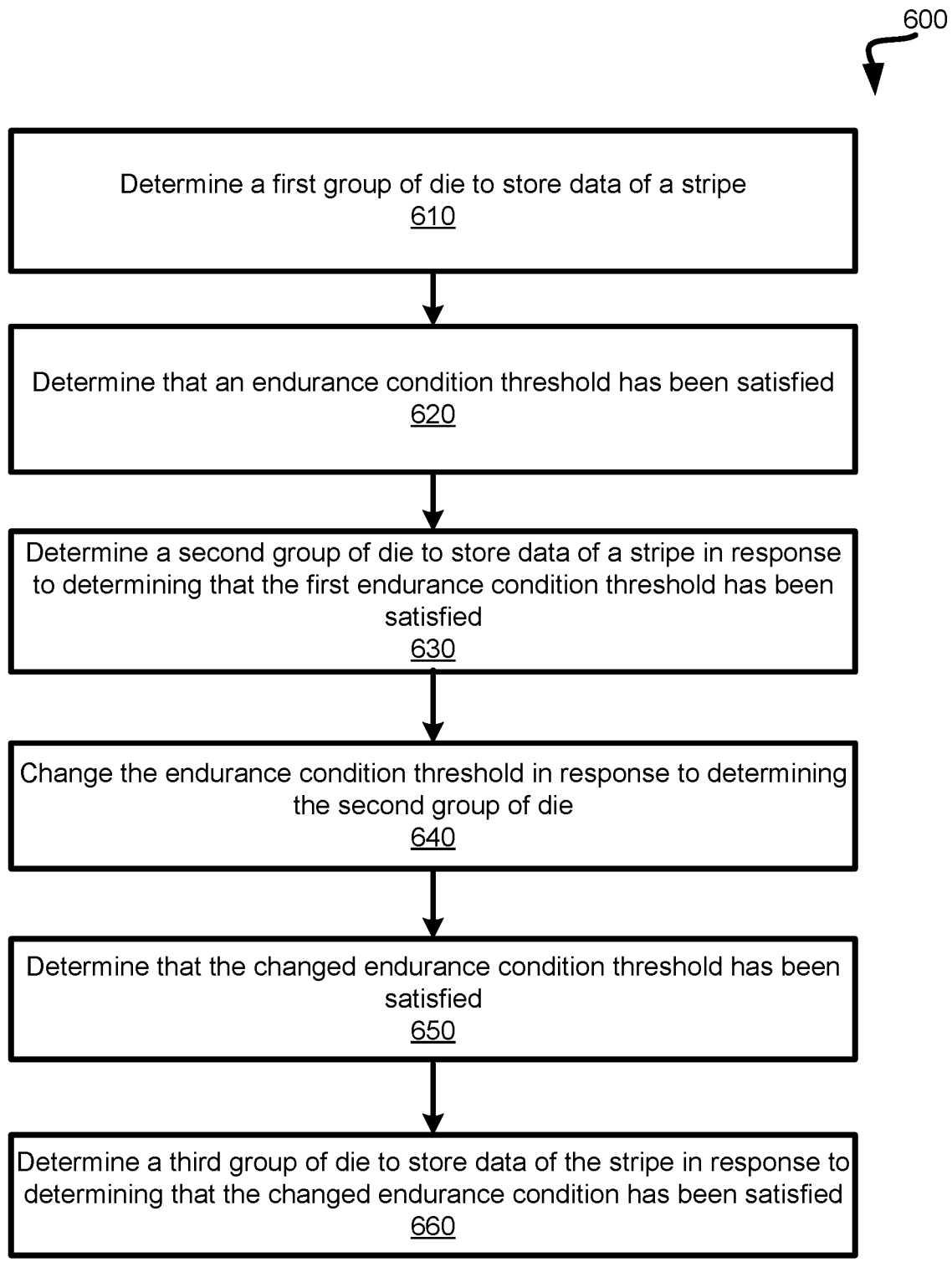
FIG. 6 is a flow diagram of an example method to change an endurance condition in accordance with some embodiments.

FIG. 6 is a flow diagram of an example method to change an endurance condition in accordance with some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the wear leveling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 6, at operation 610, the processing logic determines a first group of dice to store data of a stripe. For example, a subset of dice of a memory sub-system can be used to store user data and a parity data of a stripe. At operation 620, the processing logic determines that an endurance condition has been satisfied. For example, at least one of the die of the first group can satisfy the endurance condition threshold. At operation 630, the processing logic determines a second group of dice to store data of a stripe in response to determining that the endurance condition has been satisfied. For example, the dice that are used to store data of a stripe can be changed so that a die that was previously not being used to store data of a stripe can be included in the second group of dice while another die from the first group of dice can be removed and not included in the second group of dice.

At operation 640, the processing logic changes the endurance condition threshold in response to determining the second group of dice. For example, an increased second endurance condition threshold can be determined and the dice of the second group of dice can be monitored to determine when any die satisfies the increased endurance condition threshold. In some embodiments, the endurance condition threshold can be increased based on an observation of the dice of the memory sub-system. For example, the endurance condition threshold can be increased based on a number of dice that approached the prior endurance condition threshold and/or a rate at which the removed dice satisfied the endurance condition threshold. In some embodiments, the increase of the endurance condition threshold can be larger when fewer dice have approached (e.g., come within a threshold percentage of) the prior endurance condition threshold and/or the rate at which the removed die or dice that approached the prior endurance condition threshold was high. Thus, the changed endurance condition can be used to indicate a time when another group of dice (e.g., a third group of dice) are to be used to store data of one or more subsequent stripes.

Furthermore, at operation 650, the processing logic determines that the changed endurance condition threshold has been satisfied. For example, a die of the second group of dice can have a bit error rate that is the same or exceeds an increased bit error rate. In response to determining that the changed endurance condition threshold has been satisfied, at operation 660, the processing logic determines a third group of dice to store data of a stripe. For example, a different group of dice can be used to store data of a subsequent stripe. Furthermore, the endurance condition threshold can be changed again and increased relative to the prior endurance condition threshold.

Figure 7:
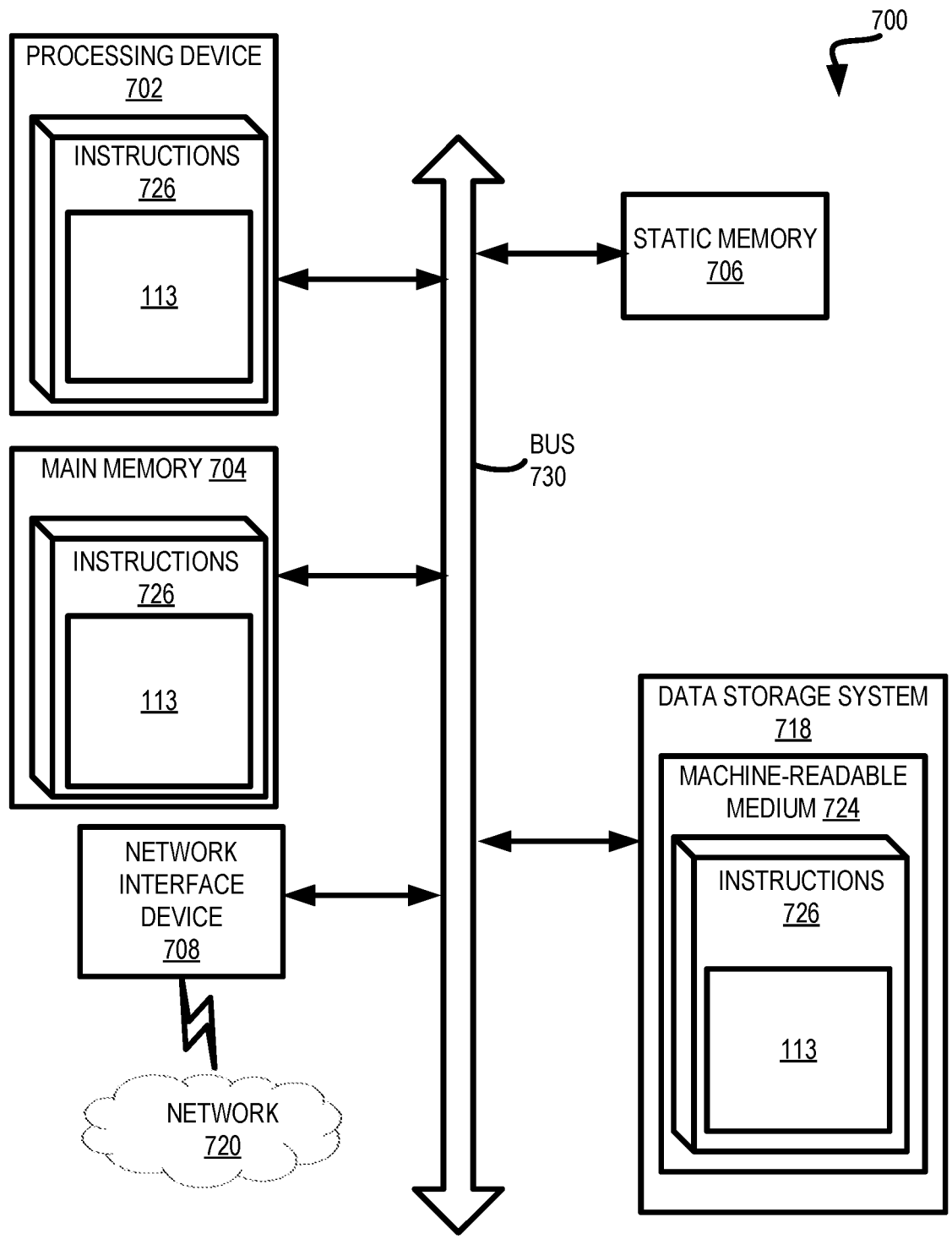
FIG. 7 is a block diagram of an example computer system in which implementations of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a wear leveling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a wear leveling component (e.g., the wear leveling component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of dice; and
   a processing device operatively coupled to the plurality dice, the processing device to perform operations comprising:
      storing data of one or more stripes at a first group of dice of a plurality of dice;
      determining that a first die of the first group of dice has satisfied an endurance condition threshold comprising a predetermined number of write operations or bit errors;
      changing the endurance condition threshold to a changed endurance condition threshold, wherein changing the endurance condition threshold is based on a number of the first group of dice to come within a threshold range of satisfying the endurance condition threshold;
      determining that a second die of the first group of dice is within the threshold range of satisfying the endurance condition threshold; and
      using the changed endurance condition threshold to determine a time to store data of one or more subsequent stripes at a second group of dice of the plurality of dice, wherein the second group of dice includes two new dice that replace the first die and the second die of the first group of dice.

2. The system of claim 1, wherein the endurance condition threshold corresponds to a bit error rate threshold, and wherein the changed endurance condition threshold corresponds to an increased bit error rate threshold.

3. The system of claim 1, wherein the endurance condition threshold corresponds to a threshold number of write operations, and wherein the changed endurance condition threshold corresponds to an increased threshold number of write operations.

4. The system of claim 1, wherein the operations further comprise determining that the second group of dice has satisfied the changed endurance condition threshold.

5. The system of claim 1, wherein the operations further comprise storing data of the one or more subsequent stripes at the second group of dice of the plurality of dice in response to determining that the first die of the first group of dice has satisfied the changed endurance condition threshold.

6. The system of claim 1, wherein the operations further comprise storing data of the one or more subsequent stripes at a third group of dice of the plurality of dice in response to determining that the second group of dice has satisfied the changed endurance condition threshold, the third group of dice including at least one die that is not included in the second group of dice.

7. The system of claim 1, wherein the changed endurance condition threshold is further based on a rate at which the first die and the second die of the first group of dice satisfied the endurance condition threshold.

8. A method comprising:
   storing, by a processing device, data of one or more stripes at a first group of dice of a plurality of dice;
   determining, by the processing device, that a first die of the first group of dice has satisfied an endurance condition threshold comprising a predetermined number of write operations or bit errors;
   changing, by the processing device, the endurance condition threshold to a changed endurance condition threshold, wherein changing the endurance condition threshold is based on a number of the first group of dice to come within a threshold range of satisfying the endurance condition threshold;
   determining that a second die of the first group of dice is within the threshold range of satisfying the endurance condition threshold; and
   using, by the processing device, the changed endurance condition threshold to determine a time to store data of one or more subsequent stripes at a second group of dice of the plurality of dice, wherein the second group of dice includes two new dice that replace the first die and the second die of the first group of dice.

9. The method of claim 8, wherein the endurance condition threshold corresponds to a bit error rate threshold, and wherein the changed endurance condition threshold corresponds to an increased bit error rate threshold.

10. The method of claim 8, wherein the endurance condition threshold corresponds to a threshold number of write operations, and wherein the changed endurance condition threshold corresponds to an increased threshold number of write operations.

11. The method of claim 8, further comprising determining that the second group of dice has satisfied the changed endurance condition threshold.

12. The method of claim 8, further comprising storing data of the one or more subsequent stripes at the second group of dice of the plurality of dice in response to determining that the first die of the first group of dice has satisfied the changed endurance condition threshold.

13. The method of claim 8, further comprising storing data of the one or more subsequent stripes at a third group of dice of the plurality of dice in response to determining that the second group of dice has satisfied the changed endurance condition threshold, the third group of dice including at least one die that is not included in the second group of dice.

14. The method of claim 8, wherein the changed endurance condition threshold is further based on a rate at which the first die and the second die of the first group of dice satisfied the endurance condition threshold.

15. A non-transitory computer-readable medium comprising instructions, which when executed by a processing device, cause the processing device to perform operations comprising:
   storing data of one or more stripes at a first group of dice of a plurality of dice;
   determining that a first die of the first group of dice has satisfied an endurance condition threshold comprising a predetermined number of write operations or bit errors;
   changing, by the processing device, the endurance condition threshold to a changed endurance condition threshold, wherein changing endurance condition threshold is based on a number of the first group of dice to come within a threshold range of satisfying the endurance condition threshold;
   determining that a second die of the first group of dice is within the threshold range of satisfying the endurance condition threshold; and
   using, by the processing device, the changed endurance condition threshold to determine a time to store data of one or more subsequent stripes at a second group of dice of the plurality of dice, wherein the second group of dice includes two new dice that replace the first die and the second die of the first group of dice.

16. The non-transitory computer-readable medium of claim 15, wherein the endurance condition threshold corresponds to a bit error rate threshold, and wherein the changed endurance condition threshold corresponds to an increased bit error rate threshold.

17. The non-transitory computer-readable medium of claim 15, wherein the endurance condition threshold corresponds to a threshold number of write operations, and wherein the changed endurance condition threshold corresponds to an increased threshold number of write operations.

18. The non-transitory computer-readable medium of claim 15, wherein the operations further comprise determining that the second group of dice has satisfied the changed endurance condition threshold.

19. The non-transitory computer-readable medium of claim 15, wherein the operations further comprise storing data of the one or more subsequent stripes at the second group of dice of the plurality of dice in response to determining that the first die of the first group of dice has satisfied the changed endurance condition threshold.

20. The non-transitory computer-readable medium of claim 15, wherein the operations further comprise storing data of the one or more subsequent stripes at a third group of dice of the plurality of dice in response to determining that the second group of dice has satisfied the changed endurance condition threshold, the third group of dice including at least one die that is not included in the second group of dice.

* * * * *